United States Patent
Mutz et al.

(10) Patent No.: US 6,911,933 B1
(45) Date of Patent: Jun. 28, 2005

(54) DYNAMIC LOGIC ALGORITHM USED FOR DETECTING SLOW-MOVING OR CONCEALED TARGETS IN SYNTHETIC APERTURE RADAR (SAR) IMAGES

(75) Inventors: Christopher W. Mutz, Cambridge, MA (US); Leonid I. Perlovsky, Brookline, MA (US); Robert J. Linnehan, Brighton, MA (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 22 days.

(21) Appl. No.: 10/847,023

(22) Filed: May 14, 2004

(51) Int. Cl.[7] .......................... G01S 13/90; G01S 13/00
(52) U.S. Cl. ................. 342/25 B; 342/25 R; 342/25 A; 342/27; 342/28; 342/89; 342/90; 342/159; 342/175; 342/176; 342/179; 342/190; 342/191; 342/195
(58) Field of Search .............................. 342/25 R–25 F, 342/27, 28, 89–103, 159–164, 175, 176, 179, 188–197

(56) References Cited

U.S. PATENT DOCUMENTS

| | | | |
|---|---|---|---|
| 6,400,306 B1 * | 6/2002 | Nohara et al. ............ | 342/25 R |
| 6,426,718 B1 * | 7/2002 | Ridgway .................... | 342/160 |
| 6,518,914 B1 * | 2/2003 | Peterson et al. .......... | 342/25 R |
| 6,608,585 B2 * | 8/2003 | Benitz ...................... | 342/25 R |
| 6,633,253 B2 * | 10/2003 | Cataldo .................... | 342/25 R |

* cited by examiner

Primary Examiner—Bernarr E. Gregory
(74) Attorney, Agent, or Firm—William G. Auton

(57) ABSTRACT

The present invention includes an application of a dynamic logic algorithm to detect slow moving targets. Show moving targets are going to be moving in the range from 0–5 mph. This could encompass troop movements and vehicles or convoys under rough terrain. The method can be defined as a seven step process of detecting slow moving targets using a synthetic aperture radar (SAR), said slow moving targets being objects of interest that are moving in the range from 0–5 mph, wherein this method is composed of the steps of receiving SAR signal history data having an SAR image; assuming a presence of slow moving target in a SAR image based-on range, cross-range position, and velocity; assuming a presence of clutter; assigning target and clutter models that are probability distribution functions (pdf) that are defined to account for every pixel in the SAR image, wherein the target is modeled using a sum of Gaussians fitted along the target shape model, while the clutter is modeled with a uniform distribution; computing a "target present" predetermined threshold value; converging the target model to a minimum variance value; and comparing the target model minimum variance value to the predetermined threshold to determine if a target is present or absent.

6 Claims, 7 Drawing Sheets

DYNAMIC LOGIC ALGORITHM USED FOR DETECTING SLOW-MOVING OR CONCEALED TARGETS IN SYNTHETIC APERTURE RADAR (SAR) IMAGES

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to radar and more specifically to an image processing and target detection process.

Moving targets are usually detected with ground moving target indication (GMTI) radars. However, very slow moving targets like tanks or dismounted troops might be below the minimum detectable velocity (MDV) of GMTI radars. In synthetic aperture radar (SAR) images, detection of moving targets is difficult because of target smear due to motion, which could make low-RCS targets fall below stationary ground clutter. Several techniques for SAR imaging of moving targets have been discussed in the following U.S. Patents, the disclosures of which are incorporated herein by reference:

U.S. Pat. No. 6,300,895, entitled Discreet radar detection method and system of implementation thereof, Carrara,
U.S. Pat. No. 5,898,399, entitled Subchirp processing method, Carrara,
U.S. Pat. No. 5,587,718, entitled Method for discovering and designating air targets, Iardella
U.S. Pat. No. 5,500,647, entitled Method for determining the rank of distance ambiguity of radar echoes, Carrara,
U.S. Pat. No. 4,972,194, entitled Method and device for compensating for the speed of clutter in a coherent doppler radar with variable blind speed, Carrara; and
U.S. Pat. No. 4,191,957, entitled Method of processing radar data from a rotating scene using a polar recording format, Walker.

The above-cited patents discuss prior art target detection techniques in SAR systems. These techniques require pre-detection, which, in turn, requires sufficient signal-to-stationary ground clutter ratio (SCR) and adequate MDV, and may result in a suboptimal performance vs. the informational content of the data (e.g. Cramer-Rao Bound). Extracting the maximum information from data is possible using adaptive, model-based approaches but in the past such approaches faced prohibitive combinatorial complexity. Parameters of the target models are unknown and have to be estimated from the image data. Combinatorial complexity is due to the need for having to consider a large number of combinations between multiple target models and the data.

In view of the foregoing there remains a need for a technique for detecting slow-moving targets in SAR images with low signal-to-clutter ratio and zero MDV without combinatorial complexity. The presentation will briefly summarize the difficulties encountered over the last 50 years related to the combinatorial complexity of computations. A new concept, dynamic logic, will be introduced along with an algorithm suitable for the detection of very slow-moving targets in SAR images. This new mathematical technique is inspired by the analysis of biological systems, like the human brain, which combines conceptual understanding with emotional evaluation and overcomes the combinatorial complexity of model-based techniques. The presentation will provide examples of detecting a single, slow moving target, and multiple moving targets.

SUMMARY OF THE INVENTION

The present invention includes an application of a dynamic logic algorithm to detect slow moving targets. Slow moving targets are going to be moving in the range from 0–5 mph. This could encompass troop movements and vehicles or convoys under rough terrain. First, we assume slow moving target model(s) in a SAR image based-on range, cross-range position, and velocity. Another model is assumed for clutter. Target and clutter models are probability distribution functions (pdf) that are defined to account for every pixel in the image. The target is modeled using a sum of Gaussians fitted along the target shape model, while the clutter is modeled with a uniform distribution.

Input to the Algorithm:

Synthetic aperture radar image (magnitude only). Phase history information is not needed or preserved. The SAR "image", which is the same one a scope operator would see visually, is what the algorithm works on.

Algorithm Start (Initializations):

X=cross range
Y=range
Vx=target velocity in cross range
Vy=target velocity in range
R=proportion of data due to target.

Set initial value estimates for the unknown target parameters (x, y, vx, vy, r). In the absence of any information about the target, we set the model initial position in the center of the image with zero velocity vx=vy=0. Initial values for the variances of the target models are high to cover the entire image, representing the uncertainty of knowledge.

Probability distribution functions are assigned over all pixels for both the clutter model (P(n|1) and the target model(s) P(n|2) . . . P(n|x) for x target models.

The Log likelihood function (similarity measure) is computed, which relates the estimated target parameters to the SAR data. This function is maximized with respect to the unknown parameters by employing the steepest descent method within each iteration.

New estimates for the parameters are computed, and the variances are reduced by a predetermined factor until a minimum variance is reached (corresponding to the approximate width of the target signature).

Once the target model has converged to a minimum variance, the final similarity measure, or Log likelihood, is compared to a predetermined threshold to determine if a target is present or absent.

The algorithm can be summarized as follows:
1) Set initial values for the unknown parameters x0, y0, vx, vy and sx, sy
2) Compute G(X, Y|Xpos, sx, sy)
3) Compute estimates x0, y0, vx, vy toward maximizing LLF
4) Estimate r1 and r2
5) Reduce sx and sy
6) Return to step 2 until minimum sx and sy are realized
7) Compare L(x, y, vx, vy) to threshold to determine if target is present or absent.

DETAILED DESCRIPTION OF THE PREFERRED EMBODIMENT

Figure 1:
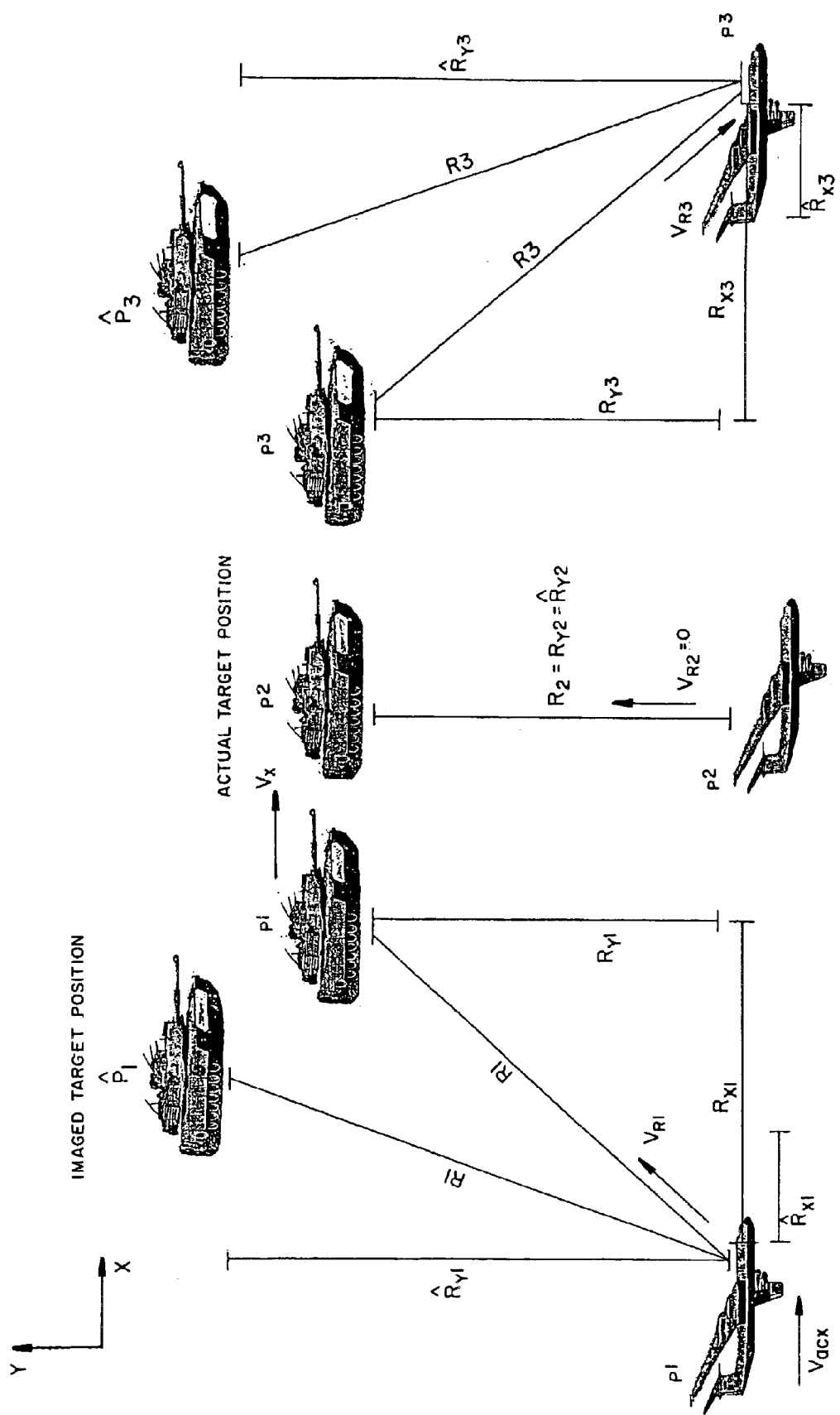
FIG. 1 is an illustration of SAR image effects of target motion.

The present invention includes an application of a dynamic logic algorithm to detect slow moving targets. Slow moving targets are going to be moving in the range from 0–5 mph. This could encompass troop movements and vehicles or convoys under rough terrain. The method can be defined as a seven step process of detecting slow moving targets using a synthetic aperture radar (SAR), said slow moving targets being objects of interest that are moving in the range from 0–5 mph, wherein this method is composed of the steps of receiving SAR signal history data having an SAR image; assuming a presence of slow moving target in a SAR image based-on range position, and velocity, assuming a presence of clutter; assigning target and clutter models that are probability distribution function (pdf) that are defined to account for every pixel in the SAR image, wherein the target is modeled using a sum of Gaussians fitted along the target shape model, while the clutter is modeled with a uniform distribution; computing a "target present" predetermined threshold value; converging the target model to a minimum variance value; and comparing the target model minimum variance value to the predetermined threshold to determine if a target is present or absent.

The detection of slowly moving targets such as tanks or dismounted troops in standard synthetic aperture radar (SAR) technology is a difficult task that has not ceded a reliable solution. Reflected energy from the target is spread over many pixels in the image due to its motion. This spreading reduces the concentration of target signal energy, degenerating the detection process. The addition of clutter from surrounding stationary objects or ground features further complicates target detection and identification. In fact a moving target signature may fall below the average clutter level in the SAR image. Ground moving target indication (GMTI) radars can detect the presence of moving targets but require significant target velocity in order to produce a distinguishable Doppler return. The challenging velocity range of target detection is from zero to the minimum detectable velocity (MDV) of GMTI radars.

Some earlier techniques have been proposed to overcome the loss of signal due to spreading and clutter. A phase compensation algorithm is offered as a method of estimating the translational and rotational motion of a target based on the presence of multiple prominent points in the image, requiring a high signal-to-clutter ratio (SCR) to select these points. Other techniques require complex changes in hardware, or complicated pre-processing and real-time techniques in order to detect targets below MDV. These methods can be costly in terms of restructuring hardware and in terms of processing power, and have yet proven to yield a viable solution. There are ongoing programs aimed at reducing MDV of GMTI[9], still detection of slow moving targets in SAR images would improve capabilities of many existing systems.

In this invention we demonstrate that it is possible to use only the final image of a side-looking focused SAR process to find moving target signatures that are buried in clutter. A model-based approach that fits a model to the data can, in principle, extract maximum information from the data. An algorithm known as multiple hypothesis testing (MHT) performs such a systematic search for a target. With this method, a model of a moving target SAR image is fit to the data for various values of the target's potential initial position and velocity (in 2 dimensions) and the likelihood is computed. The maximum likelihood solution is selected and compared to a threshold for detection. Noting that the combinations of these parameters are quite high, the number of computations could reach $10^{10}$ for a 100×100 pixel image. Furthermore, searching for two targets in an image would require the union of both target parameter combinations, increasing the number of computations to $10^{20}$. The same combinatorial increase in computations occurs if a slow moving target is next to an extended clutter object that looks like a moving target. The number of computations grows exponentially with the number of targets searched. The combinatorial complexity quickly exceeds the computational power of any existing computer.

The algorithm proposed in this invention is developed for a specific solution but has broad applications. Relating data to "big picture" concepts is the challenge of many current methodologies in data mining, sensor\data fusion, signal processing and exploitation. The relationship between data and concepts is referred to as modeling field theory (MFT)[7]. Just as the human mind relates internal visual representations of objects like a car with retinal signals, MFT for SAR associates a moving target concept model with the input image. Well-known model-based techniques such as MHT rely on trying many combinations to find the target model that best fits the data. But the human mind does this at a pre-conscious, fuzzy level. The mind does not sift through every possible internal visual object-model, in every possible orientation, and in combination with other objects to recognize a car on the road. Rather visual models are associated pre-consciously with retinal signals to quickly accomplish object recognition. In a similar manner to visual object recognition, the algorithm that accomplishes MFT is referred to as dynamic logic.

Dynamic logic mitigates combinatorial complexity by comparing all models and data simultaneously. Fuzzy models dynamically converge onto corresponding data using feedback from a similarity measure. Each model then can be understood as behaving like an intelligent agent by refining its parameters to extract maximum target information from the data. Just like internal visual models "grab" onto the corresponding internal retinal signals, internal models of stationary and moving targets converge onto streaks or spots in SAR images that best fit the models. Table 1 illustrates the robustness of the dynamic logic algorithm to increasing target complexity. The computational cost of the dynamic logic algorithm (DLA) increases linearly with the number of target models while the classical MHT algorithm increases exponentially.

TABLE 1

| 100 × 100 Pixel Image 1 | | |
|---|---|---|
| Number of Target Models | MFT Computations | MHT Computations |
| 1 | $10^8$ | $10^{10}$ |
| 2 | $2 \times 10^8$ | $10^{20}$ |
| 3 | $3 \times 10^8$ | $10^{30}$ |

The application of MFT to target detection will now be described. An iterative algorithm has been developed that implements dynamic logic and exploits the neurological discoveries described above. The algorithm ultimately estimates the unknown target $$L(\hat{x}_0,\hat{y}_0,\hat{v}_x,\hat{v}_y) > \text{threshold} \rightarrow \text{target}$$

$$L(\hat{x}_0,\hat{y}_0,\hat{v}_x,\hat{v}_y) > \text{threshold} \rightarrow \text{no target}$$

parameters of initial position $x_0$, $y_0$ and velocity $v_x$, $v_y$, and produces a likelihood measure, L, that is a function of these estimates for comparison to a threshold to determine target presence.

The algorithm will be discussed in more detail later but we digress here to review the properties of moving target SAR images.

Models of Slow Moving Target SAR Images

In our analysis we will assume targets are moving in a straight line without linear or rotational acceleration. The unknown parameters are the target's initial position ($x_0$, $y_0$) and constant velocity ($v_x$, $v_y$) in the cross-range dimension x and range dimension y. Knowledge of how linear target motion becomes distorted in a SAR image is necessary to properly estimate the unknown target parameters. A basic understanding of SAR image formation[5,6] is assumed here. A moving target will appear shifted and stretched in the cross-range dimension, and smeared in the range dimension due to motion-induced phase errors[4]. In standard SAR imaging, the phase errors due to target motion are not corrected during signal processing because all reflected energy is attributed to stationary objects (clutter or targets). Stationary ground clutter produces Doppler frequency shifts due to the aircraft motion. Low velocity targets will not produce a Doppler frequency shift sufficient enough to be isolated from Doppler frequency shifts from clutter. Looking at FIG. 1 we see the aircraft moving in the positive x direction indicated at positions p1, p2 and p3. The target is also moving in the +x direction ($v_x > 0$, $v_y = 0$), indicated at positions p1, p2, and p3. If there is no surrounding clutter, the aircraft can measure the range $R_p$ and Doppler frequency $f_D$ of the target.

$$R_p = \frac{c \cdot t_d}{2} \rightarrow f_D = f_0 \frac{2V_{Rp}}{c} \text{ for } p1, p2, p3,$$

where c is the speed of light, $t_d$ is the measured time delay, $f_0$ is the radar carrier $$V_{Rp} = (V_{acx} - v_x) \frac{R_{xp}}{R_p},$$

frequency, and $V_{Rp}$ is the relative velocity projected onto the line of site between the aircraft and target:
where $V_{acx}$ is the aircraft velocity, $V_x$ is the target velocity, and $R_{xp}$ is the true range from the aircraft to the target in the x dimension. SAR processing assumes that $V_{Rp}$ only depends on the aircraft velocity so the estimate of the target range in the x dimension $\hat{R}_x$ depends only on $V_{acx}$. The estimate in the y dimension $\hat{R}_y$ depends on $\hat{R}_x$, the true range $R_p$ and the known height h above the target:

$$\hat{R}_x = \frac{V_{Rp}R_p}{V_{acx}} = \frac{(V_{acx} - v_x)R_x}{V_{acx}}, \quad (1)$$

$$\hat{R}_y = \sqrt{R_p^2 - \hat{R}_x^2 - h^2}. \quad (2)$$

For instance, at p1 the aircraft will measure the range to target, $R_1$, and the Doppler frequency based on the relative velocity projected onto the line of site to the target. At point p1 the target is moving away from the aircraft so its Doppler frequency is lower relative to a stationary scatterer at the same true position. This results in the target at point p1 appearing at image point p̂1, stretched back toward the aircraft in the x direction but maintaining the correct range R1.

At point p2 the aircraft is broadside to the target so there is no relative velocity and thus $f_D = 0$. Here the image of the moving target is placed in its true position. At point p3 the target is moving toward the aircraft so the Doppler frequency is greater than a stationary scatterer (still negative since the aircraft is moving away much faster). This places the target image position toward the aircraft in cross-range at point p̂3.

FIGS. 1: 15 an Illustration of SAR Image Effects of Target Motion

Figure 2:
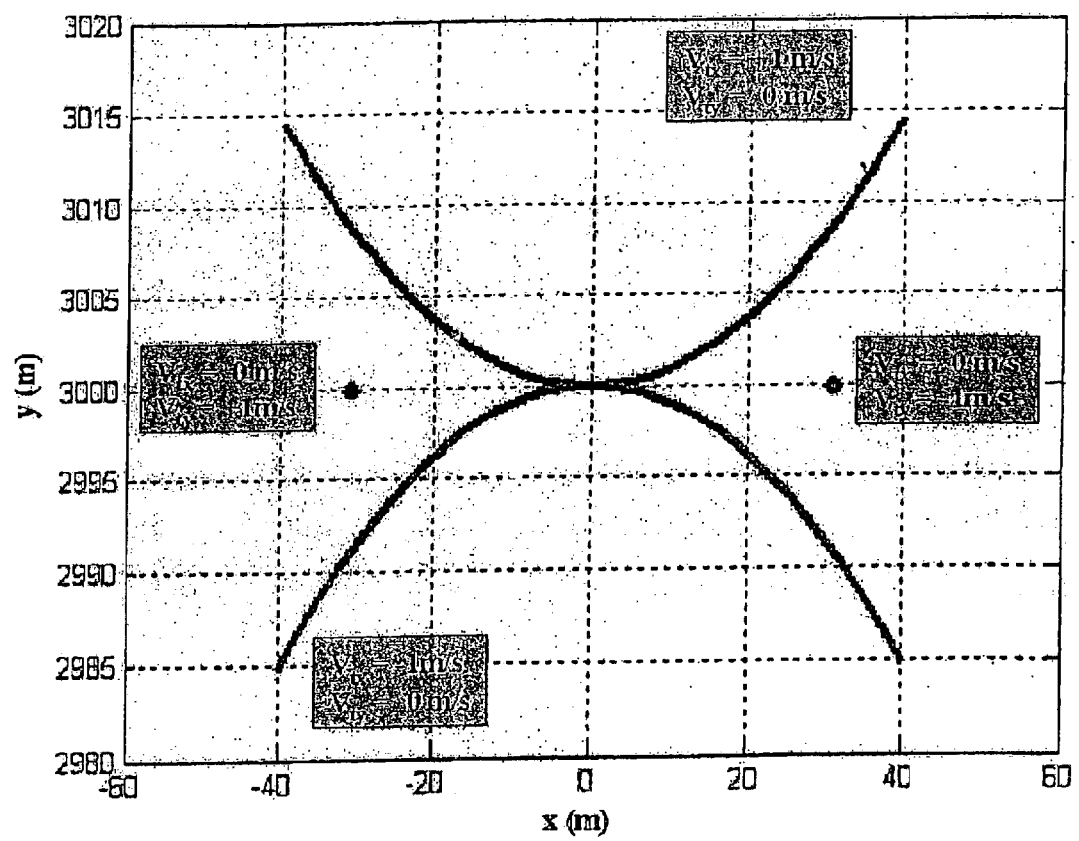
FIG. 2 is a chart of the effects of target motion in x and y dimensions.

SAR images for targets moving in various directions are summarized in FIG. 2. Here the true target paths (not shown) are symmetric about the center of the grid, which is broadside to the aircraft, again moving in the +x direction ($V_{acx} > 0$). As described before a target moving parallel in the same direction as the aircraft ($v_x > 0$, $v_y = 0$) produces a convex contour (facing away in range relative to the aircraft). The translated image of a target moving in parallel but in the opposite direction of the aircraft ($v_x < 0$, $v_y = 0$) is a concave contour (facing down toward the aircraft). Targets with motion only in the range (y) dimension appear as a point (stationary) target but shifted back in cross-range for motion in the +y direction, and forward in cross-range for motion in the −y direction. A target with motion in both the x and y directions produces a translated SAR image that is both shifted due to its y velocity, and contoured due to its x velocity.

FIG. 2 as a chart of the effects of target motion in x and y dimensions.

A simulated side-looking focused SAR image was produced using a matched filter technique[5,6]. The target is moving in the +x direction with $v_y = 0$. The realistic effects (sidelobes) of target motion are visible. A contour line, generated using the analytical expressions for $\hat{R}_x$ and $\hat{R}_y$ above (eq. 1 & 2), is superimposed for comparison. The analytical contour fits the simulated image well as it nearly bisects the simulated image over its most intense region.

The parameter estimates for a particular iteration provide the estimated target path based on these analytical equations. Gaussian distributions are computed at each target location, i.e., each time sample t. Thus the means of these distributions are determined by the current target parameter estimates and the variances are determined by the particular iteration in a brute force sense, i.e., we begin with large variances on the first iteration and reduce them by a fixed percent on every subsequent iteration until some predetermined minimum value is reached. The target model compared to the data in the dynamic logic algorithm is not simply the contour line produced by eq. 1 & 2, but the contour shape determined by the sum of the Gaussian distributions over t.

Forgoing $v_y$ Estimation In Moving Target Detection

We now address the question of image inversion. The target model equations (eq. 1 & 2) only very weakly depend on $v_y$. This leads to two conclusions. First, in order to fit the model to the data an accurate estimate of $v_y$ is not needed, which simplifies the detection process. Secondly, $v_y$ cannot be accurately estimated from a SAR image. In this section we explore this issue in some detail.

It is possible to determine the unknown parameters $x_0$, $y_0$, $v_x$, and $v_y$ given at least three points in the SAR image curve.

However, allowing for measurement errors (fuzziness) in the target image contour we find that there are many inverse solutions, i.e., there are many true target paths that produce virtually the same SAR image. For instance, in FIGS. 3a and 3b below the true target paths on the left translate to the SAR images on on the right. Note here that the actual target paths are tangent to the SAR image contours on the right. The x velocity components of the true paths are very close to being equal. However, the velocity components in the y direction vary. Furthermore, a target moving only in the range dimension will appear as a point target. A point target SAR image verifies that $v_x=0$, but solving for the remaining parameters is ambiguous since many combinations of $x_0$, $y_0$, and $v_y$ will translate to the same point on the SAR image.

This ambiguity in $v_y$ can be used to our advantage. The goal of the algorithm is to determine the presence or absence of slow moving targets in clutter. Estimating the target parameters is necessary only to evaluate a likelihood value that is compared to a threshold for detection. The accuracy of $x_0$, $y_0$, $v_x$, and $v_y$ estimates is not critical as long as the final output $L(\hat{x}_0, \hat{y}_0, \hat{v}_x, \hat{v}_y)$ is maximized (or close to the maximum). Since $\hat{v}_y$ does not significantly affect the likelihood, we can forgo estimating $v_y$ and assume it is zero. This will reduce the number of computations in the algorithm by 25%.

Figure 3A:
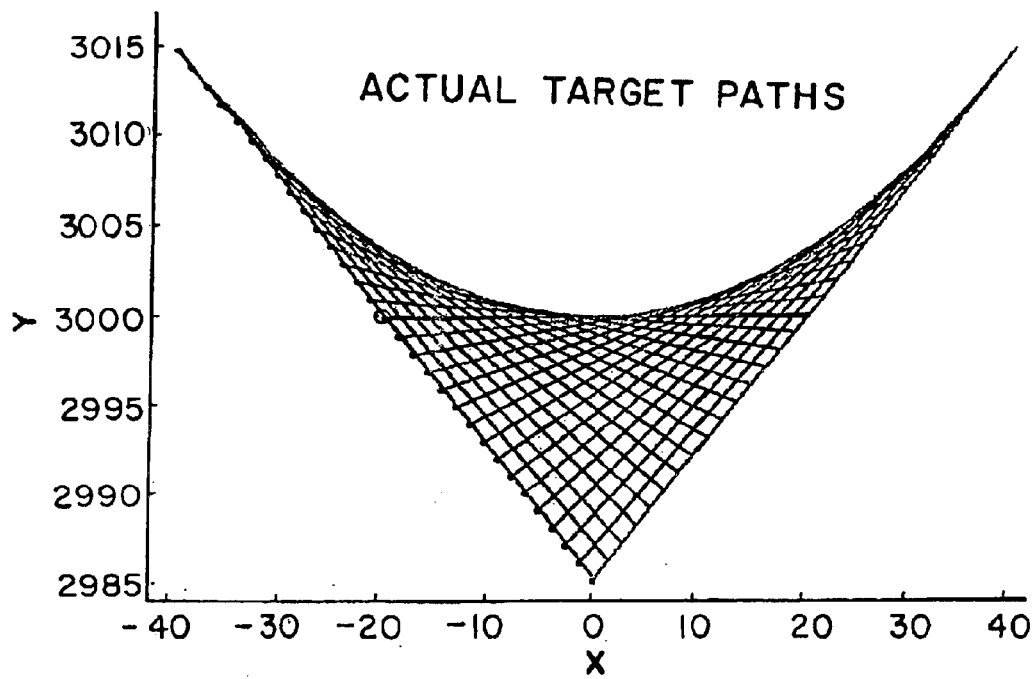
FIG. 3a and 3b are charts of the ambiguity of actual target path translation to SAR image.
Figure 3B:
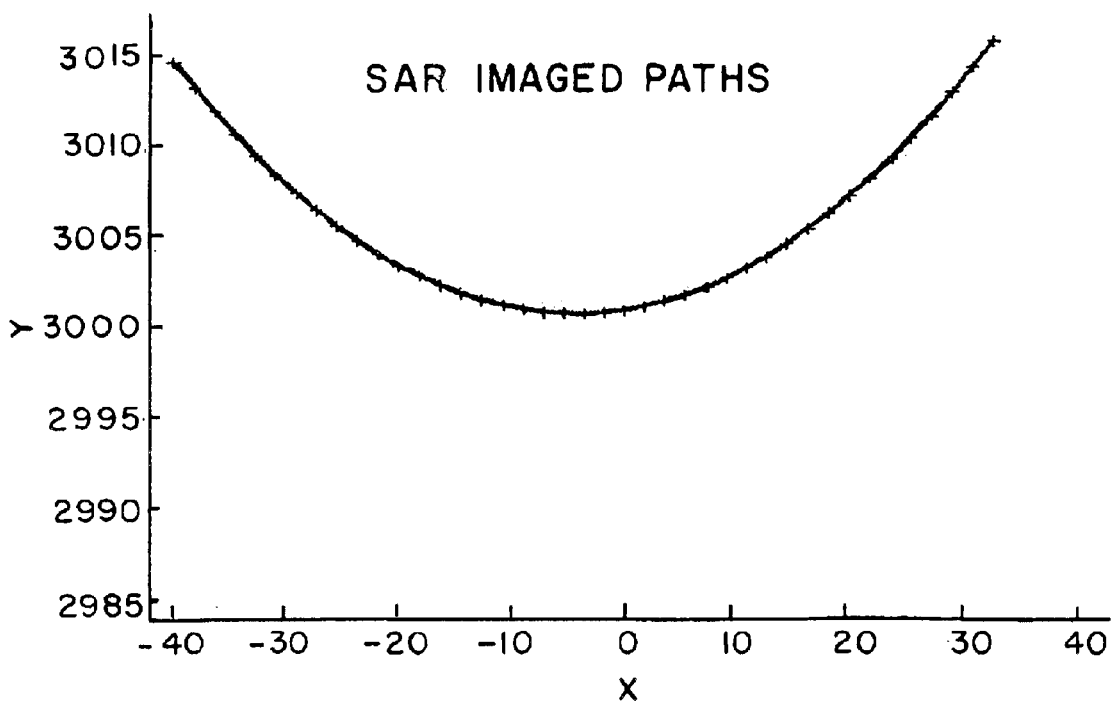

FIG. 3a: The ambiguity of actual target path translation to SAR image.

Figure 4:
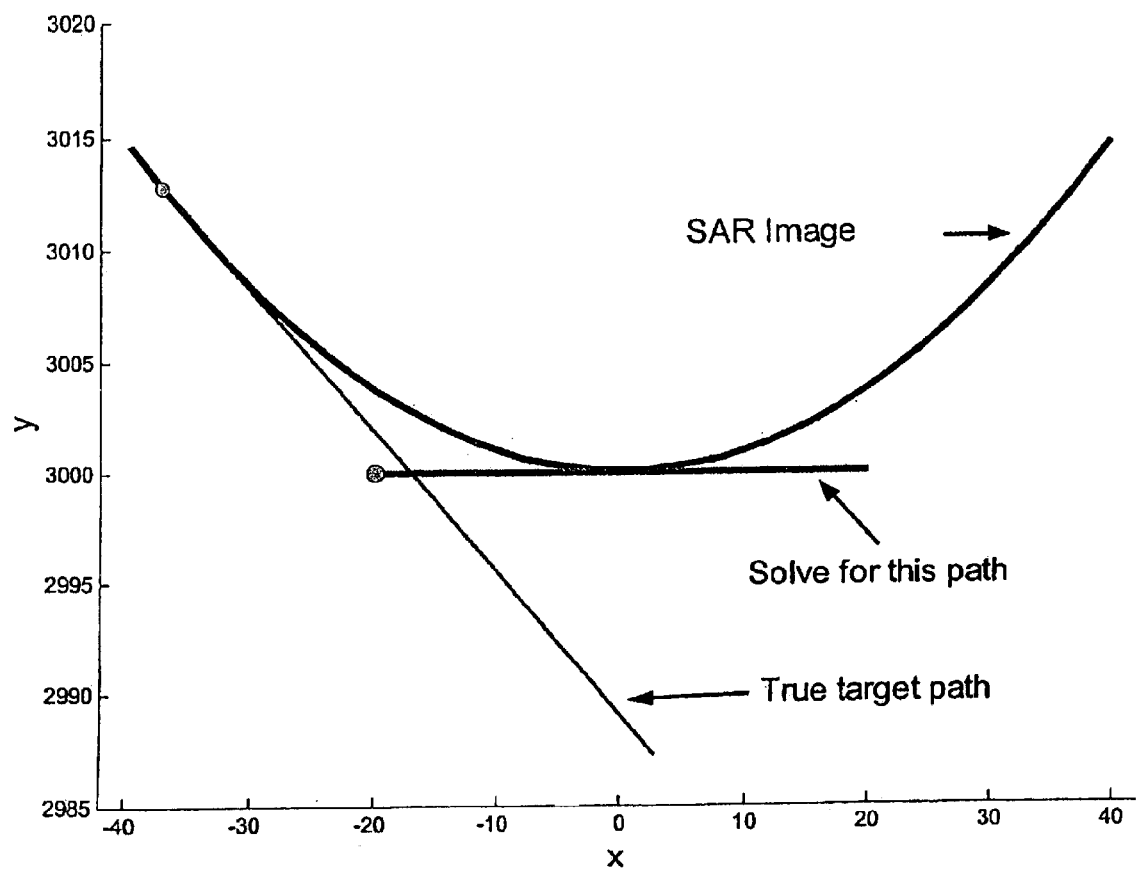
FIG. 4 is a chart of computations of SAR image as reduced by the effects of the target path.

For instance, in FIG. 4, the true target path with $v_y \pm 0$ produces the SAR image shown. Solving for a target path that has $v_y=0$ will yield the same likelihood value as a target path with the true $v_y$. The likelihood measure will be a function of the remaining parameter estimates.

FIG. 4: Computations are reduced by assuming $v_y=0$

The Dynamic Logic Algorithm

Details of the iterative dynamic logic algorithm for moving target detection are now presented. We will first introduce the case where only one possible target is present in the image. Thus we have two models: one for clutter and one for the target. The following parameters defined are known values:

2 Models:
m=1 Clutter
m=2 Target
N: total number of SAR pixels in image
n: pixel index
S(n): signal (power or reflectivity) in pixel n
$N_p$: number of pulses during observation
PRF: pulse repetition frequency (pulses/sec)
t: time sample vector, $$t = \frac{1}{PRF}[0 \ 1 \ 2 \ \ldots \ N_p - 1]$$

The following are variable parameters:
$r_1$: proportion of signal power from clutter
$r_2$: proportion of signal power from target (=1−r1)
$\sigma_x$, $\sigma_y$: standard deviations in the x and y dimensions
Target parameter estimates: $\hat{x}_0, \hat{y}_0, \hat{v}_x$ ($\hat{v}_y = 0$).

An updated estimate of the target parameters occurs during every iteration. The translated SAR target model converges to the most likely SAR target image in the data. On the first iteration the target model is estimated to be located in the center of the image with zero velocity. The standard deviations are initialized to a large value, including the entire image, corresponding to the uncertainty of knowledge:

$$\sigma_x = \sigma_y = \frac{\sqrt{N}}{2}.$$

The following matrices are defined in their Matlab representations:

$$X_n = \begin{bmatrix} x_{n=1} & x_{n=1} & \ldots & x_{n=1} \\ \vdots & & & \\ x_{n=N} & x_{n=N} & \ldots & x_{n=N} \end{bmatrix}$$

$$X_{pos} = \begin{bmatrix} \hat{x}_{t=0} & \hat{x}_{t=1} & \ldots & \hat{x}_{t=Np-1} \\ \vdots & & & \\ \hat{x}_{t=0} & \hat{x}_{t=1} & \ldots & \hat{x}_{t=Np-1} \end{bmatrix} (N \times N_p),$$

$$Y_n = \begin{bmatrix} y_{n=1} & y_{n=1} & \ldots & y_{n=1} \\ \vdots & & & \\ y_{n=N} & y_{n=N} & \ldots & y_{n=N} \end{bmatrix}$$

$$Y_{pos} = \begin{bmatrix} \hat{y}_{t=0} & \hat{y}_{t=1} & \ldots & \hat{y}_{t=Np-1} \\ \vdots & & & \\ \hat{y}_{t=0} & \hat{y}_{t=1} & \ldots & \hat{y}_{t=Np-1} \end{bmatrix} (N \times N_p).$$

The rows of $X_n$ and $Y_n$ are the known coordinates (absolute positions) of the image for each pixel D. The columns of $X_n$ and $Y_n$ are repeated by the length of t (the number of time samples $N_p$, i.e., the number of Gaussain distributions pre-selected to model the SAR target image). The columns of $X_{pos}$ and $Y_{pos}$ are the current estimated target positions based on equations 1 & 2 of the target in dimensions x and y respectively. The rows of $X_{pos}$ and $Y_{pos}$ are repeated by the number pixels N in the image.

The Gaussian distributions for each component of t are computed for all pixels n. As stated previously, the mean values in this distribution are the current estimated target positions ($X_{pos}$, $Y_{pos}$). The variances $\sigma^2_x$, $\sigma^2_y$ are decreased at a constant rate after every iteration, corresponding to an improvement in the target parameter estimation.

$$G(X_n, Y_n | X_{pos}, Y_{pos}, \sigma_x, \sigma_y) =$$
$$\frac{1}{2\pi\sigma_x\sigma_y}\exp\left(-\frac{1}{2}[(X_n - X_{pos})^2/\sigma_x^2 + (Y_n - Y_{pos})^2/\sigma_y^2]\right).$$

We will refer to this function in the shorthand notation G(n,t).

We can compute probability distribution functions over all pixels n for both the clutter model (m=1) and the target model (m=2). A uniform distribution is computed for the clutter model with weight $r_1$ (the proportion of non-target pixels) applied to each pixel n. For m=2 we will multiply G(n,t) by $r_2$ (the proportion of target pixels) and sum over t:

model 1 → pdf(n|1)=[$r_1 \ r_1 \ \ldots \ r_1$]$^T$ (N×1), model 2 → $pdf(n|2) = \sum_{t=0}^{N_p-1} r_2 \cdot G(n, t)$ (N × 1).

The total pdf(n) is computed as the sum of pdf(n|1) and pdf(n|2), total pdf for n → pdf(n)=pdf(n|1)+pdf(n|2), and the probabilities for each pixel are computed as the following:

$$P(n|1) = \frac{pdf(n|1)}{pdf(n)},$$

$$P(n|2) = \frac{pdf(n|2)}{pdf(n)}.$$

This can be interpreted as follows: P(n|1) is the probability that pixel n "belongs to the clutter model" or that the signal in a particular pixel originates from clutter; P(n|2) is the probability pixel n "belongs to the target model" or that the signal in a particular pixel originates from the target, for n=1, 2, . . . N. P(n|1)+P(n|2)=1 for n=1, 2, . . . N, in correspondence with the total probability (for each pixel receiving any signal) being 1.

Note that these probabilities are estimates based on the current target parameter estimates for a particular iteration. Therefore, these quantities are not "real" probabilities, rather they can be considered as "subjective, estimated probabilities".

A similarity measure is computed that evaluates the correspondence of the estimated $$L = \sum_{n=1}^{N} S(n)\ln[pdf(n)].$$

model to the data S(n). This can be interpreted as mutual information in models about the data[7]:

Dynamic logic maximizes this function over the three unknown parameters:

$$\max_{\hat{x}_0, \hat{y}_0, \hat{v}_x} (L).$$

We perform the maximization using the steepest descent method within each iteration. That is, we use the gradients of L with respect to $\hat{x}_0, \hat{y}_0$ and $\hat{v}_x$ to determine how to adjust the parameter estimates that maximize L at every iteration.

After the parameters $x_0$, $y_0$, and $v_x$ are estimated for the current iteration, the proportion values r1 and r2 are then estimated as:

$$R_1 = \sum_{n=1}^{N} S(n)P(n|1), \quad R_2 = \sum_{n=1}^{N} S(n)P(n|2),$$

$$r_1 = \frac{R_1}{R_1 + R_2}, \quad r_2 = \frac{R_1}{R_1 + R_2}.$$

Finally, the standard deviations $\sigma_x$, $\sigma_y$ are reduced by a factor 0.96 for the next iteration. The process is continued until a predefined value (1 pixel resolution) of $\sigma_x$, $\sigma_y$ is realized. (It takes on the order of 50 to 100 iterations. We did not yet optimize the convergence process. Convergence of this algorithm was proved in[7].) The algorithm is summarized as follows:

1) Set initial values for the unknown parameters $\hat{x}_0, \hat{y}_0, \hat{v}_x$, and for $\sigma_x$, $\sigma_y$.
2) Compute G(n,t),
3) Compute pdf(n|m), P(n|m), for m=1, 2
4) Compute estimates $\hat{x}_0, \hat{y}_0, \hat{v}_x$
5) Estimate $r_1$ and $r_2$,
6) Reduce $\sigma_x$ and $\sigma_y$,
7) Return to step 2 until minimum $\sigma_x$ and $\sigma_y$ are realized.

The algorithm, when applied to a large image (100×100 pixels), is further computationally optimized by splitting it into two stages. The first stage operates on the whole image and searches for smaller areas that may contain a target. At this stage uncertainty of the target model exceeds uncertainty of image shapes due to velocity, therefore the process is simplified by only estimating $\hat{x}_0$ and $\hat{y}_0$ i.e., using a single Gaussian function that is only dependent on n, not on t. This reduces the computations of stage 1 so it can efficiently converge to a smaller target area. The second stage uses the estimated parameters $\hat{x}_0$ and $\hat{y}_0$ from stage 1 and performs a more refined search and estimation using a complete target model including a sum over t. The initial values of $\sigma_x$ and $\sigma_y$ for stage 2 are taken from the final values of $\sigma_x$ and $\sigma_y$. The three parameters $\hat{x}_0$, $\hat{y}_0$ and $\hat{v}_x$ are estimated.

EXAMPLE 1

Single Target Detection

A target is moving with $v_x$=0.5 m/s and has an initial position $x_0$=−6 m, y=3030 m.

The signal to clutter ratio (SCR) is defined by the maximum absolute value of the target signal and random clutter that is properly scaled. More details on the SCR definition are provided later.

Detecting more than one target requires adding more models to the algorithm. Similar to the single target case, m=1 represents clutter, m=2 represents target 1, m=3 represents target 2, . . . , m=M represents target M-1. Each target has its own target parameters to be estimated: $x_{0m}$, $y_{0m}$ and $V_{xm}$.

The probability distribution functions are computed as follows:

$$pdf(n|1)=[r_1\ r_1\ \ldots\ ]^T,$$

$$pdf(n|2) = \sum_{t=0}^{N_p-1} r_2 \cdot G_2(n, t) \quad \text{for the 1}^{st}\text{ target parameters,}$$

$$pdf(n|3) = \sum_{t=0}^{N_p-1} r_3 \cdot G_3(n, t) \quad \text{for the 2}^{nd}\text{ target parameters,}$$

$$\vdots$$

$$pdf(n|M) = \sum_{t=0}^{N_p-1} r_M \cdot G_M(n, t) \quad \text{for the } (M-1)^{th}\text{ target parameters}$$

with the requirement that $r_1+r_2+\ldots+T_M=1$.

The total pdf(n) is given by:

$$pdf(n)=pdf(n|1)+pdf(n|2)+pdf(n|3)+\ldots+pdf(n|M).$$

The mutual information is computed as before in the single target case:

$$L = \sum_{n=1}^{N} S(n)\ln[pdf(n)].$$

The LLF is then maximized over the unknown parameters of all target models:

$$\max_{\hat{x}_{0m}, \hat{y}_{0m}, \hat{v}_{xm} \rightarrow \text{for } m=2,3,\ldots M} (L).$$

EXAMPLE 2

|  | Target 1 | Target 2 | Target 3 |
|---|---|---|---|
| $v_x$ | 0.3 m/s | 0.4 m/s | −0.3 m/s |
| SCR | −0.70 dB | −1.98 dB | −0.73 dB |

The mutual information functions are individually computed for each target model ($L_m$) and compared to a threshold.

$$L_m = \sum_{n=1}^{N} S(n)\ln[pdf(n|1) + pdf(n|m)] \text{ for } m = 2, 3, \ldots M$$

$L(\hat{x}_0, \hat{y}_0, \hat{v}_0) >$ threshold → target $L(\hat{x}_0, \hat{y}_0, \hat{v}_0) >$ threshold → no target Performance Analysis Receiver operating curves (ROC) were produced in a standard way using simulated clutter. We generated random clutter scenarios in 100×100 pixel images with one meter range and cross-range resolutions. The dynamic logic algorithm was then executed with and without a target signal added to the clutter. This was done using 150 random realizations for several signal-to-clutter ratios.

Simulating Clutter with a Specific Signal to Clutter Ratio

The performance of the dynamic logic algorithm is evaluated using simulated clutter that is scaled with respect to a simulated moving target image. The clutter is initially produced in Matlab using the normally distributed random number generator. Each pixel is assigned a real and imaginary value with zero mean and variance of one. The signal to clutter ratio (SCR) is computed using the maximum magnitude of a stationary target and the scaled clutter. The stationary target is created using the matched filter simulation and place in the image at the mid-point of the desired moving target path. The following values are calculated:

$s_{ts\ max} = \max|S_{ts}(n)|^2$ maximum power for stationary target signal, $$\bar{s}_c = \frac{1}{N}\sum_{n=1}^{N} |S_c(n)|^2 \rightarrow \text{average clutter power,}$$

where $S_{ts}(n)$ is the stationary target complex signal and $S_c(n)$ is the clutter complex signal.

A scale factor for the desired SCR is computed and applied to the clutter, which is then added to a simulated moving target complex signal $S_{tm}(n)$ as follows:

$$a = \frac{1}{SCR}\frac{s_{ts\ max}}{\bar{s}_c},$$

The absolute value of the complex signal S(n) is the input image signal to the detection algorithm (the DLA). The SCR of a moving target is significantly lowered in each SAR resolution cell compared to the SCR based on the stationary target. The moving target SCR is computed using the maximum absolute value of $S_{tm}(n)$, which is the value displayed in the examples.

ROC Results

Figure 5A:
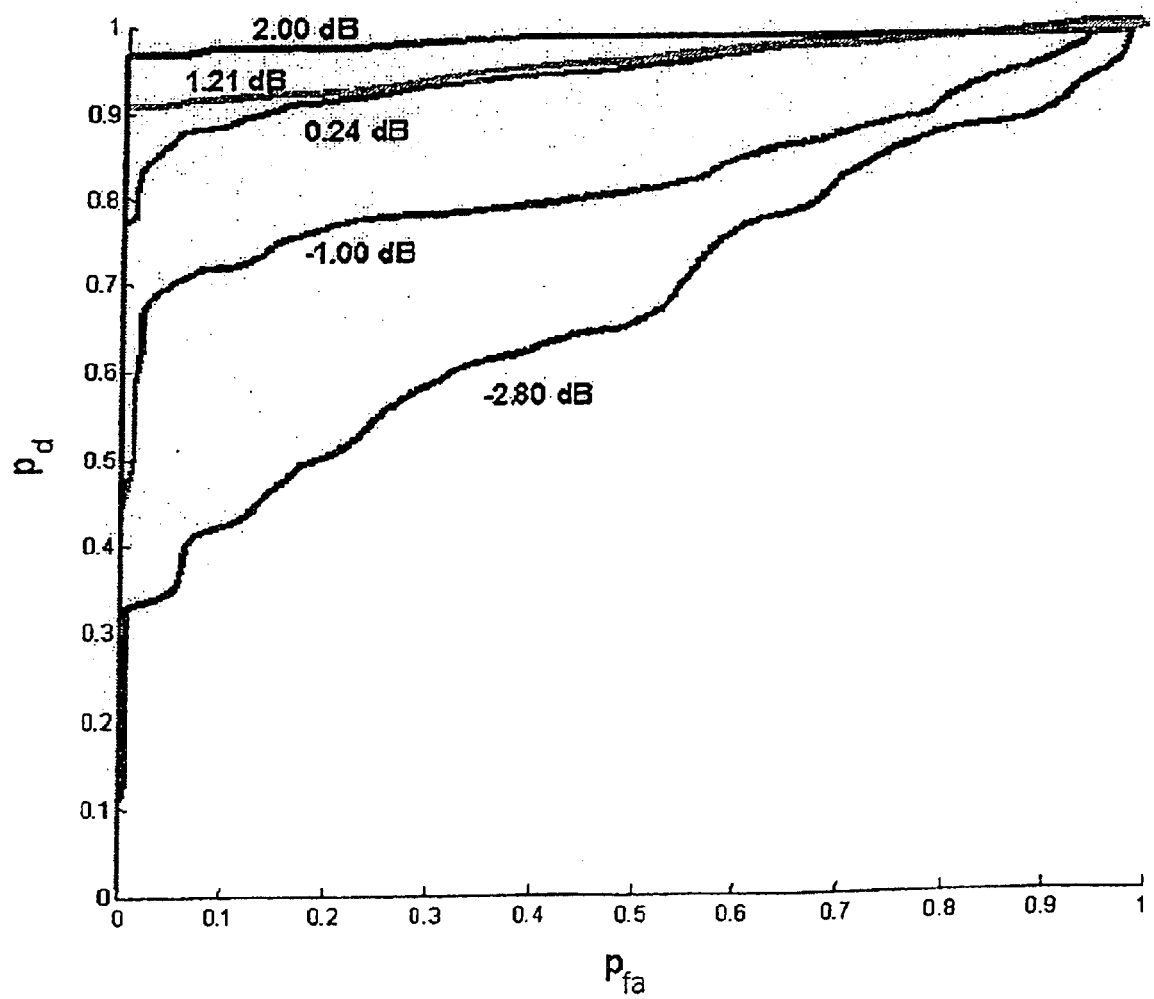
FIGS. 5a and 5b are charts of ROC plot for a single target.
Figure 5B:
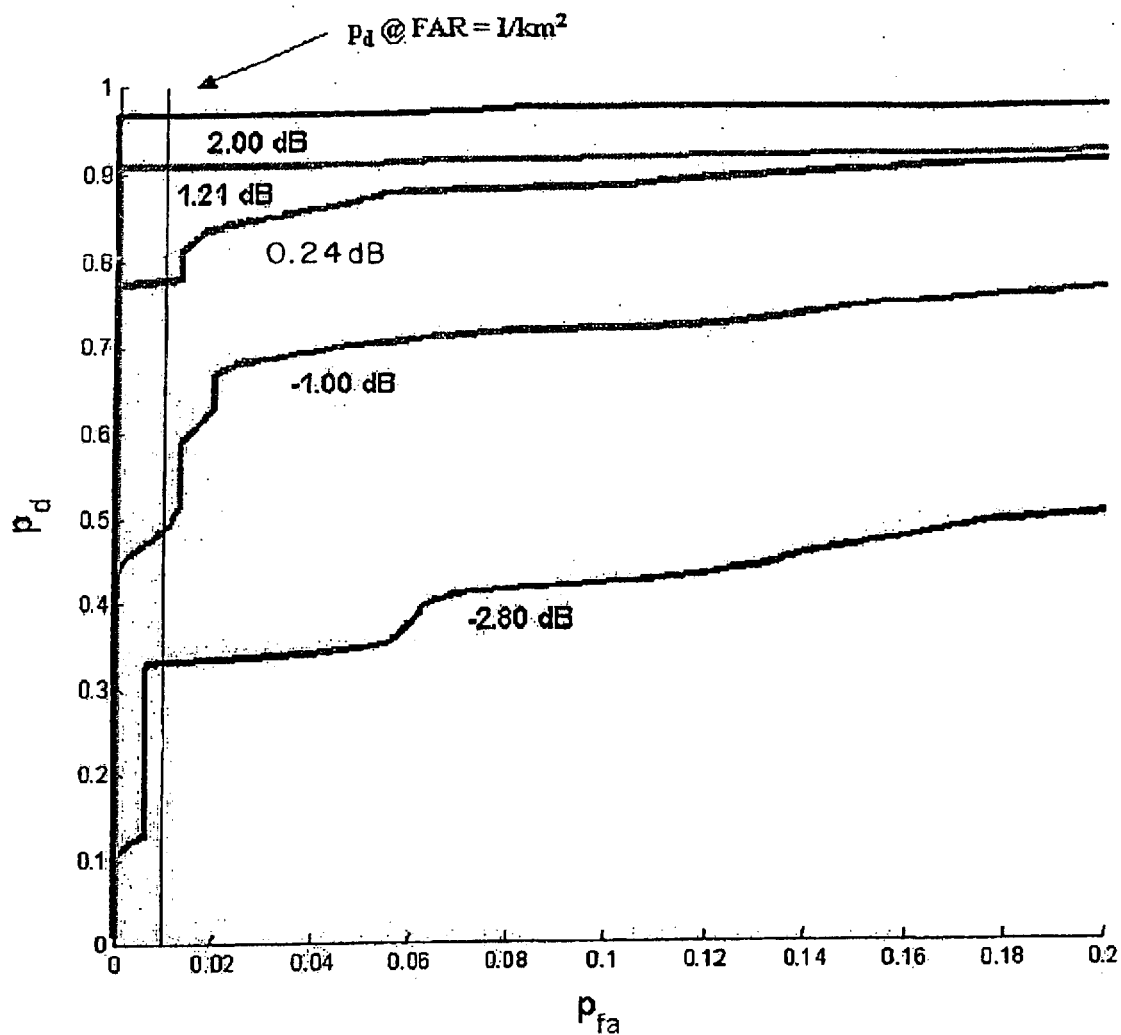

FIG. 5a displays the receiver operating curves. The image area is 0.01 km². By generating the 150 realizations we are able to estimate false alarm rates (FAR) down to approximately 1/km² (150*0.01 km²~1/km²) Expanding the portion of interest around low FAR values in FIG. 5b we see the detection probabilities for a false alarm rate of 1/km².

FIG. 5a: ROC plot for single target FIG. 5b.

CONCLUSION

The dynamic logic algorithm (DLA) is a novel technique for model-based estimation and detection that has proven to overcome previous limitations of model-based techniques. Multiple hypothesis testing (MHT) is the general state-of-the-art technique for model-based estimation and detection restricted by a combinatorial explosion of computations. The addition of target models increases the number of computations exponentially with MHT, whereas a linear increase is expected using the DLA.

An argument can be made that DLA vs. MHT is not a fair comparison since MHT is not necessarily appropriate to the moving target cases we presented. It is argued instead to refocus the SAR image multiple times for all velocities of interest, resulting in moving targets becoming more pronounced in clutter. Although such a procedure is non-combinatorial, it is still very intensive computationally, and requires access to the raw phase history data (which the proposed DLA approach does not require). Also this alternative technique is non-combinatorial only for simple random clutter used in our examples. In realistic cases, clutter descretes are present (elongated clutter shapes of slightly increased intensities appearing similar to moving target images) that could be refocused into target-like bright spots and thus increase the false alarm rate.

Figure 6:
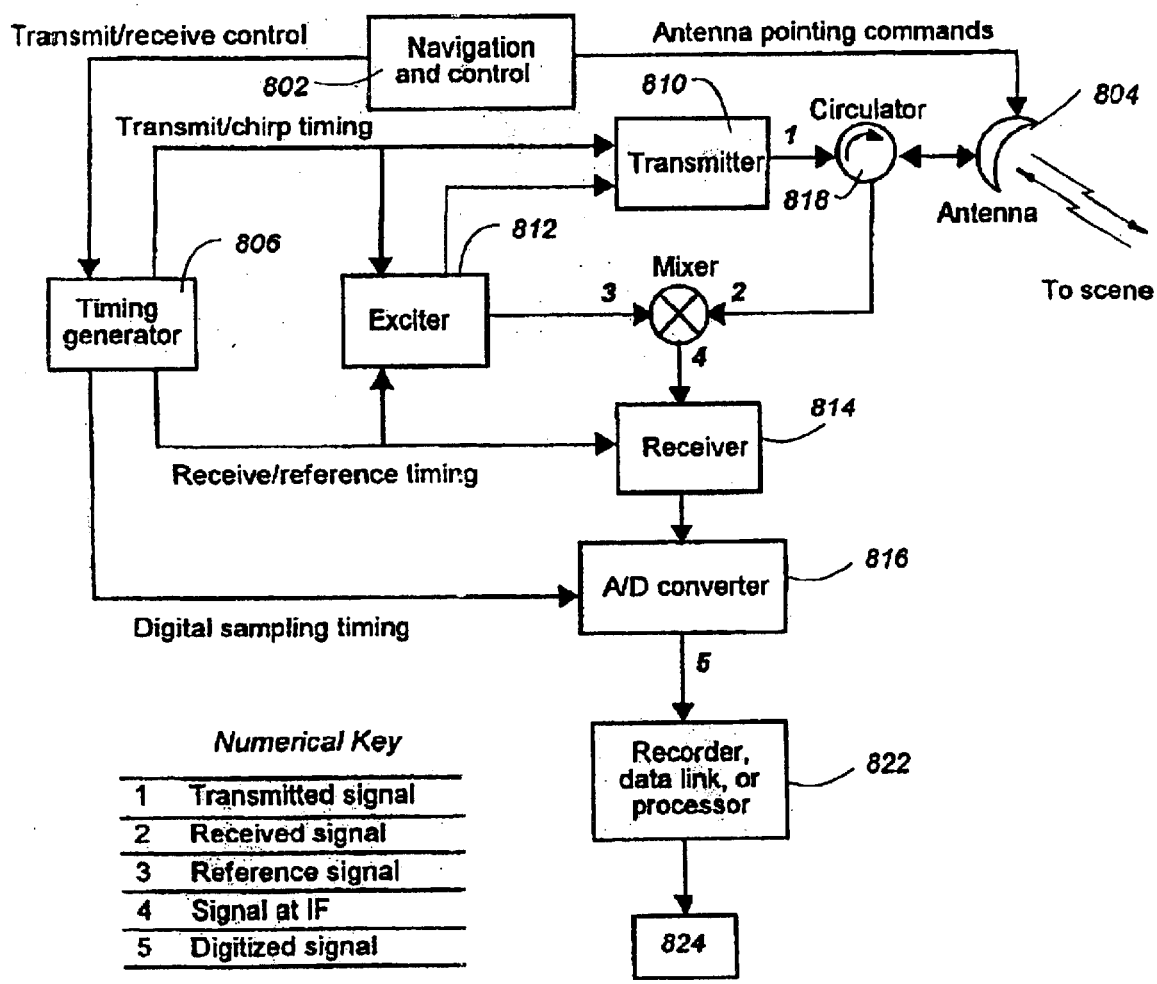
FIG. 6 is a block diagram of an SAR radar system that uses the present invention.

FIG. 6, depicts basic components in a SAR system responsible for the generation, collection and initial processing of received signals for archiving, display, or other purposes. This figure is taken from "Spotlight Synthetic Aperture Radar: Signal Processing Algorithms," W. Carrara, R. Goodman, R. Majowski, Artech House, Boston, MASS. A navigation and control block 802 provides antenna pointing commands to an antenna 804 and transmit/receive control signals to a timing generator 806, and an exciter 812. The timing generator 806 also provides receive and reference timing signals both to the exciter 812 and to a receiver 814 as well as digital sampling to an analog-to-digital (A/D) converter 816.

The circulator 818 and mixer 820 coordinate transmit and receive operations. The output of the A/D converter 816 is available for a variety of purposes at block 822, including temporary storage via data recorder, communication to a remote processing center via data recorder, communication to a remote processing center via data link or direct processing or facilitate, for example, an image display at block 824. The method of the invention operates upon the digitized output-intensive initial steps of the range migration algorithm, or RMA.

The navigation and control block 802 represents the control computer that uses the algorithms described above.

While the invention has been described in its presently preferred embodiment it is understood that the words which have been used are words of description rather than words of limitation and that changes within the purview of the appended claims may be made without departing from the scope and spirit of the invention in its broader aspects.

What is claimed is:

1. The method of detecting slow moving targets using a synthetic aperture radar (SAR), said slow moving targets being objects of interest that are moving in the range from 0–5 mph, said method comprising the steps of:

receiving SAR signal history data having an SAR image;

assuming a presence of slow moving target in a SAR image based-on range, cross-range position, and velocity;

assuming a presence of clutter;

assigning target and clutter models that are probability distribution functions (pdf) that are defined to account for every pixel in the SAR image, wherein the target is modeled using a sum of Gaussians fitted along the target shape model, while the clutter is modeled with a uniform distribution;

computing a "target present" predetermined threshold value;

converging the target model to a minimum variance value; and comparing the target model minimum variance value to the predetermined threshold to determine if a target is present or absent.

2. The method of detecting slow moving targets, as defined in claim 1, wherein said assigning target and clutter models step comprises:

processing synthetic aperture radar image data by assigning algorithm start initializations comprising:

X=cross range

Y=range $V_x$=target velocity in cross range $V_y$=target velocity in range

R=proportion of data due to target setting initial value estimates for the unknown target parameters (x, y, vx, vy, r) in the absence of any information about the target, and set the model initial position in the center of the image with zero velocity vx=vy=0 wherein initial values for the variances of the target models are high to cover the entire image, representing the uncertainty of knowledge; and assigning probability distribution functions over all pixels for both the clutter model (P(n|1)) and the target model (s) P(n|2) . . . P(n|x) for x target models.

3. The method of detecting slow moving targets, as defined in claim 2, wherein a Log likelihood function, which is a similarity measure, is computed, which relates an estimated target parameters to the SAR data, and wherein this function is maximized with respect to unknown parameters by employing a steepest descent method within each iteration.

4. The method of detecting slow moving targets, as defined in claim 3, wherein new estimates for the parameters are computed, and variances are reduced by a predetermined factor until a minimum variance is reached corresponding to the approximate width of the target signature.

5. The method of detecting slow moving targets, as defined in claim 4, wherein the target model is converged to a minimum variance, and a final similarity measure, or Log likelihood, is compared to a predetermined threshold to determine if a target is present or absent.

6. The method of detecting slow moving targets, as defined in claim 5, wherein the algorithm can be summarized as follows:

1) Set initial valued of the unknown parameters x0, y0, vx, vy and sx, sy

2) Compute G(X, Y|Xpos, Ypos, sx, sy)

3) Compute estimates x0, y0, vx, vy toward maximizing LLF

4) Estimate r1 and r2

5) Reduce sx and sy

6) Return to step 2 until minimum sx and sy are realized; and

7) Compare L(x, y, vx, vy) to threshold to determine if target is present or absent.

* * * * *